United States Patent
Katoh

(10) Patent No.: US 7,436,163 B2
(45) Date of Patent: *Oct. 14, 2008

(54) DC-DC CONVERTER

(75) Inventor: Tomonari Katoh, Osaka (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/635,763

(22) Filed: Dec. 8, 2006

(65) Prior Publication Data

US 2007/0145964 A1  Jun. 28, 2007

Related U.S. Application Data

(63) Continuation of application No. 10/553,050, filed on Oct. 12, 2005, now Pat. No. 7,187,159.

(51) Int. Cl.
*G05F 1/573* (2006.01)
(52) U.S. Cl. .................................................. 323/285
(58) Field of Classification Search ............ 323/282, 323/283, 284, 285, 351; 363/50, 59, 60
See application file for complete search history.

(56) References Cited

U.S. PATENT DOCUMENTS

| 6,469,481 | B1 | 10/2002 | Tateishi |
| 6,914,421 | B2 | 7/2005 | Yamamoto |
| 6,960,906 | B2 | 11/2005 | Yamashita |
| 7,068,023 | B2 | 6/2006 | Okada |
| 7,187,159 | B2 * | 3/2007 | Katoh ................ 323/285 |
| 2003/0128489 | A1 | 7/2003 | Katoh et al. |

FOREIGN PATENT DOCUMENTS

| JP | 4-127307 | 4/1992 |
| JP | 5-111241 | 4/1993 |
| JP | 11-8969 | 1/1999 |
| JP | 2003-186554 | 7/2003 |
| JP | 2003-333831 | 11/2003 |

* cited by examiner

*Primary Examiner*—Adolf Berhane
(74) *Attorney, Agent, or Firm*—Dickstein Shapiro LLP

(57) ABSTRACT

A DC-DC converter is disclosed that includes a constant voltage circuit outputting a first voltage, a charge pump circuit outputting a second voltage, a current detection circuit converting the output current of the constant voltage circuit into a third voltage and outputting the third voltage, a first detection circuit detecting the first voltage and outputting a first detection voltage proportional thereto, a first overcurrent protection circuit comparing the third voltage and the first detection voltage and reducing the output first voltage and current of the constant voltage circuit when the third voltage exceeds the first detection voltage, a second detection circuit detecting the second voltage and outputting a second detection voltage proportional thereto, and a second overcurrent protection circuit comparing the third voltage and the second detection voltage and reducing the output first voltage and current of the constant voltage circuit when the third voltage exceeds the second detection voltage.

13 Claims, 4 Drawing Sheets

DC-DC CONVERTER

CROSS REFERENCE TO RELATED APPLICATIONS

The present application is a continuation of U.S. patent application Ser. No. 10/553,050, filed on Oct. 12, 2005, now U.S. Pat. No. 7,187,159 the disclosure of which is incorporated by reference in its entirety.

TECHNICAL FIELD

The present invention relates generally to charge-pump-type DC-DC converters having a constant voltage circuit provided at a previous stage, and more particularly to a charge pump-type DC-DC converter having an overcurrent protection circuit.

BACKGROUND ART

The charge pump-type DC-DC converters allow high voltage to be obtained with high efficiency for a low current load. Further, the charge pump-type DC-DC converters dispense with components such as a transformer and an inductor, so that all circuits can be integrated into a single IC. Accordingly, the charge pump-type DC-DC converters have been employed in a wide variety of circuits such as a memory circuit, a CCD drive circuit, and an LCD drive circuit.

However, the conventional charge pump-type DC-DC converters have only been able to generate a voltage that is an integral multiple of an input voltage. In order to solve this problem, a charge pump-type DC-DC converter additionally including a variable voltage source at a previous stage so as to be able to set an input voltage to a desired value to obtain a desired output voltage has been proposed. Japanese Laid-Open Patent Application No. 5-111241 discloses such a charge pump-type DC-DC converter.

The conventional charge pump-type DC-DC converter having a variable voltage source at a previous stage employs a constant voltage circuit as the variable voltage source, and includes an overcurrent protection circuit in the constant voltage circuit.

FIG. 1 is a circuit diagram showing a conventional charge pump-type DC-DC converter 100. The DC-DC converter 100 includes a constant voltage circuit part 101 and a charge pump circuit part 102. Further, the constant voltage circuit part 101 includes a voltage control part 103 and an overcurrent protection circuit part 104. The voltage control part 103 includes a voltage control transistor Ma, resistors Ra and Rb generating and outputting a detection voltage VdA proportional to the output voltage VoA of the constant voltage circuit part 101, a reference voltage generator circuit 111 generating a predetermined reference voltage VrA, and an operational amplifier AMPa.

The operational amplifier AMPa controls the gate voltage of the voltage control transistor Ma so that the detection voltage VdA is equalized with the reference voltage VrA. As a result, the output voltage VoA of the constant voltage circuit part 101 is equal to $VrA \times (Ra+Rb)/Rb$, where Ra and Rb indicate the resistances of the resistors Ra and Rb, respectively.

The overcurrent protection circuit part 104 includes a current detection transistor Mb detecting the current flowing through the voltage control transistor Ma, a resistor Rc converting the current flowing through the current detection transistor Mb into voltage, an operational amplifier AMPb comparing the voltage generated in the resistor Rc and the detection voltage VdA, and a current control transistor Mc controlling the output current of the voltage control transistor Ma.

Referring to FIG. 2, when the output current ioA of the constant voltage circuit part 101 increases to ia, the voltage at the inverting input terminal of the operational amplifier AMPb exceeds the detection voltage VdA to switch on the current control transistor Mc. As a result, the gate voltage of the voltage control transistor Ma increases. Accordingly, the output voltage VoA of the constant voltage circuit part 101 decreases, and an increase in the current ioA output from the voltage control transistor Ma is controlled. When the output voltage VoA of the constant voltage circuit part 101 decreases, the detection voltage VdA also decreases. Accordingly, the current ioA output from the voltage control transistor Ma starts to decrease. This relationship between the output voltage VoA and the output current ioA is shown in FIG. 2. In FIG. 2, the characteristic indicated by OUTa represents the relationship between the output voltage VoA and the output current ioA of the constant voltage circuit part 101, and the characteristic indicated by OUTb represents the relationship between the output voltage VoB and the output current ioB of the charge pump circuit part 102.

As shown in FIG. 2, when the output voltage VoA of the constant voltage circuit part 101 decreases to 0 V, the output current ioA decreases to only ib. This is because if the overcurrent protection circuit part 104 reduces the output current ioA to 0 A, the output voltage VoA may not rise in the case of rising from 0 V. When the output voltage VoA of the constant voltage circuit part 101 is 0 V, a positive offset voltage is caused to be generated at the inverting input terminal of the operational amplifier AMPb so that a current of ib flows as the output current ioA. The offset voltage may be generated by, for instance, changing the size of each of the transistors used for the two inputs of the operational amplifier AMPb.

The charge pump circuit part 102 includes switch elements SWa, SWb, SWc, and SWd, which are MOS transistors, capacitors Ca, Cb, and Cc, and a clock generator circuit 112 controlling the switching of the switch elements SWa through SWd. The clock generator circuit 112 generates and outputs clock signals CLKa, CLKb, and CLKc. The switching of the switch element SWa, the switching of the switch element SWd, and the switching of the switch elements SWb and SWc are controlled by the clock signals CLKa, CLKb, and CLKc, respectively. The clock signals CLKa and CLKb are opposite in phase. The switch element SWa is switched ON when the level of the clock signal CLKa is LOW, and the switch element SWd is switched ON when the level of the clock signal CLKb is HIGH. Accordingly, the switch elements SWa and SWd are switched ON and OFF simultaneously.

The switch elements SWb and SWc are switched ON when the level of the clock signal CLKc is LOW. When the switch elements SWa and SWd are switched ON, the capacitor Cb is charged with the output voltage VoA of the constant voltage circuit part 101. When the switch elements SWb and SWd are switched ON, the voltage of the capacitor Cb is added to the capacitor Ca, so that the capacitor Cc is charged with the combined voltage. Accordingly, the voltage of the capacitor Cc, which is the output voltage VoB of the charge pump circuit part 102, is double the output voltage VoA of the constant voltage circuit part 101. Since the output voltage VoB of the charge pump circuit part 102 is double the output voltage VoA of the constant voltage circuit part 101, the output current ioB of the charge pump circuit part 102 is half of the output current ioA of the constant voltage circuit part 101 as shown in FIG. 2.

However, according to such a conventional circuit, even when the output terminal OUTb of the charge pump circuit part 102 is short-circuited to ground, the output voltage VoA of the constant voltage circuit part 101 is prevented from becoming 0 V, and is only reduced to a voltage Vs shown in FIG. 2. This is because the switch elements SWa through SWd are provided between the output terminal OUTa of the constant voltage circuit part 101 and the output terminal OUTb of the charge pump circuit part 102. This causes the problem that a current ic, larger than the current ib that flows when the output terminal OUTa of the constant voltage circuit part 101 is short-circuited to ground, flows as the current ioA supplied from the constant voltage circuit part 101.

DISCLOSURE OF THE INVENTION

Accordingly, it is a general object of the present invention to provide a charge pump-type DC-DC converter having a constant voltage circuit at a previous stage in which the above-described disadvantage is eliminated.

A more specific object of the present invention is to provide a charge pump-type DC-DC converter having a constant voltage circuit at a previous stage, the DC-DC converter including an overcurrent protection circuit that can reduce the output current of a charge pump circuit part to a desired value even if the output terminal of the charge pump circuit part is short-circuited to ground.

The above objects of the present invention are achieved by a DC-DC converter of a charge pump type, including: a constant voltage circuit part configured to convert an input voltage into a first voltage and output the first voltage from a first output terminal; a charge pump circuit part configured to convert the first voltage input from the constant voltage circuit part into a second voltage and output the second voltage from a second output terminal; a current detection circuit part configured to convert an output current of the constant voltage circuit part into a third voltage and output the third voltage; a first output voltage detection circuit part configured to detect the first voltage at the first output terminal and generate and output a first detection voltage proportional to the detected first voltage; a first overcurrent protection circuit part configured to compare the output third voltage and the output first detection voltage and reduce the output first voltage and the output current of the constant voltage circuit part when the output third voltage is higher than the output first detection voltage; a second output voltage detection circuit part configured to detect the output second voltage of the charge pump circuit part and generate and output a second detection voltage proportional to the detected second voltage; and a second overcurrent protection circuit part configured to compare the output third voltage and the output second detection voltage and reduce the output first voltage and the output current of the constant voltage circuit part when the output third voltage is higher than the output second detection voltage.

According to the above-described DC-DC converter, a second overcurrent protection circuit part performing overcurrent protection by detecting the output voltage of a charge pump circuit part is provided so as to operate when the output voltage of the charge pump circuit part is reduced below the output voltage of a constant voltage circuit part. Accordingly, even if the output terminal of the charge pump circuit is short-circuited to ground, the output current of the charge pump circuit can be reduced to the same current value as when the output terminal of the constant voltage circuit part is short-circuited to ground. Therefore, the reliability of the DC-DC converter is increased.

BRIEF DESCRIPTION OF THE DRAWINGS

Other objects, features and advantages of the present invention will become more apparent from the following detailed description when read in conjunction with the accompanying drawings, in which.

BEST MODE FOR CARRYING OUT THE INVENTION

A description is given below, with reference to the accompanying drawings, of an embodiment of the present invention.

Figure 1:
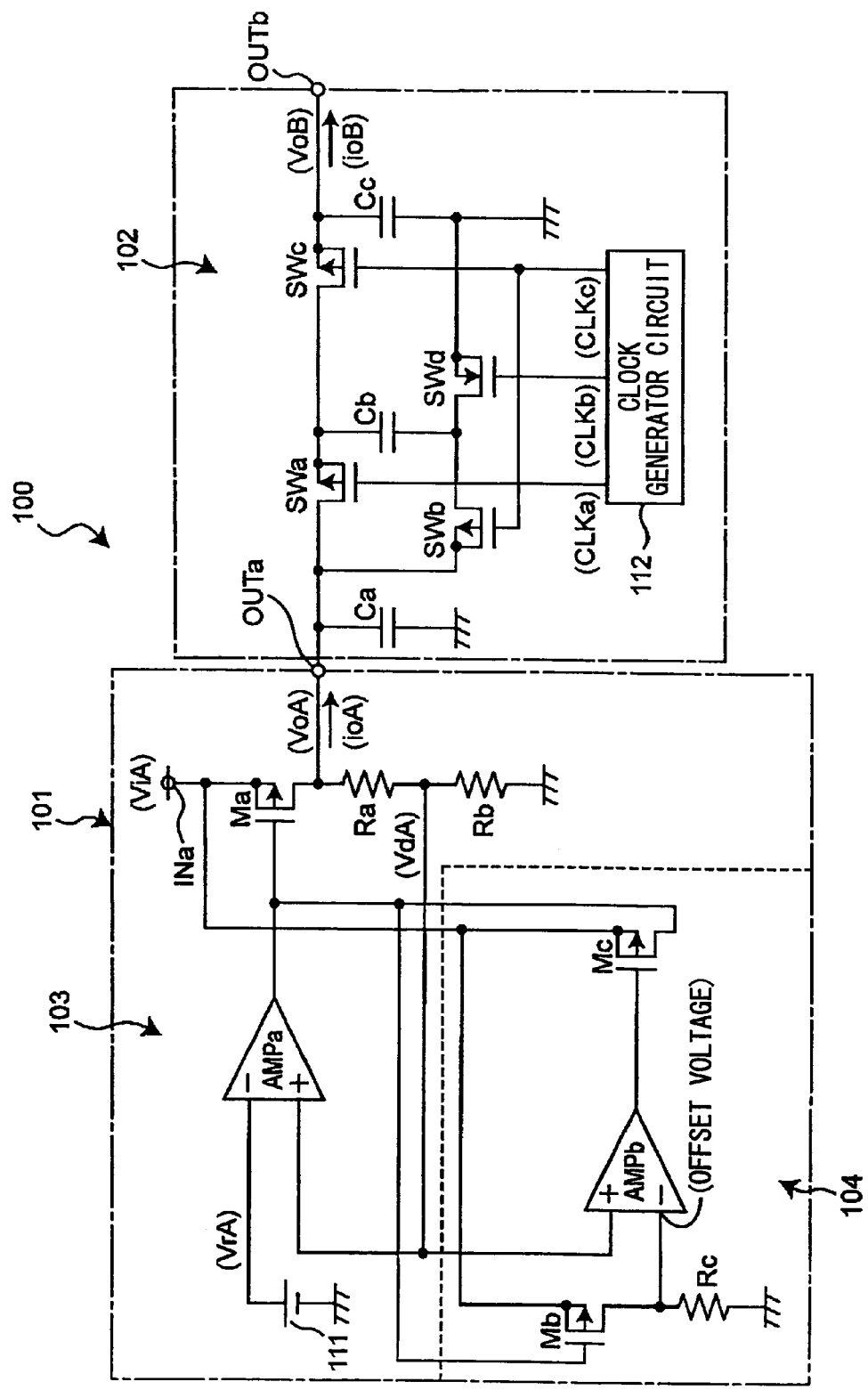
FIG. 1 is a circuit diagram showing a conventional charge pump-type DC-DC converter.
Figure 2:
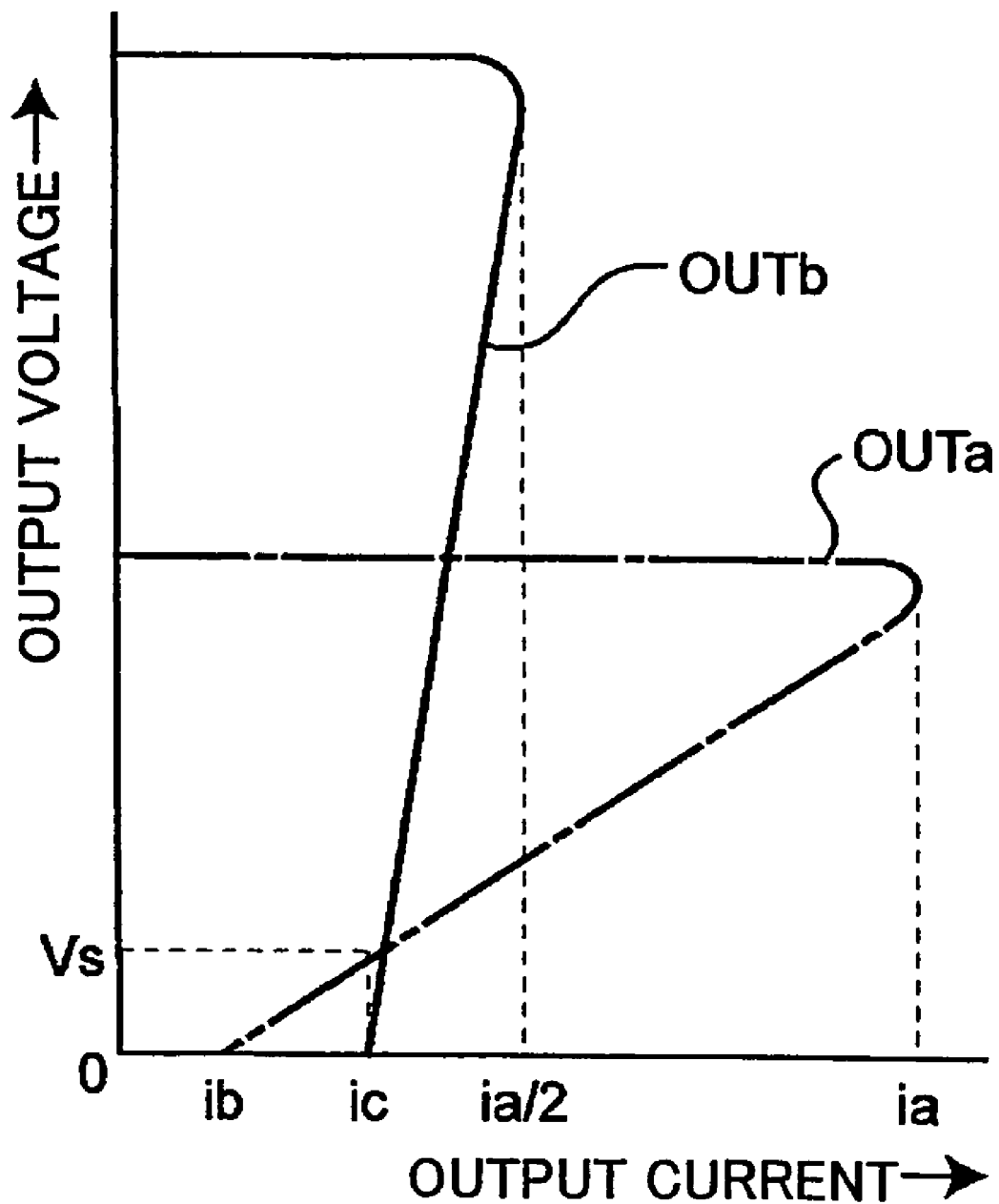
FIG. 2 is a graph showing the relationship between output voltage and output current at each output terminal of the conventional DC-DC converter.
Figure 3:
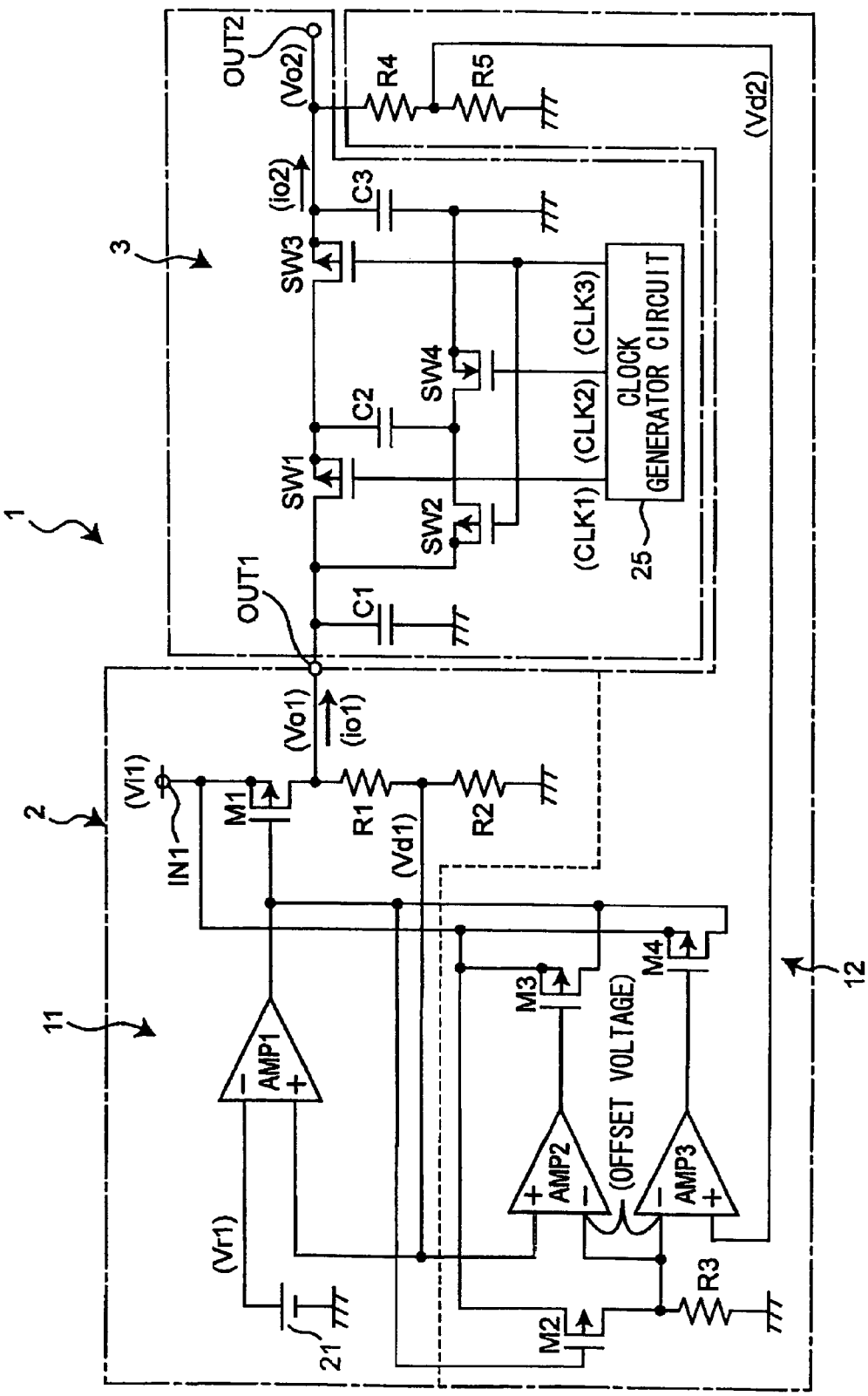
FIG. 3 is a circuit diagram showing a DC-DC converter according to an embodiment of the present invention.

FIG. 3 is a circuit diagram showing a DC-DC converter 1 according to the embodiment of the present invention.

The DC-DC converter 1 includes a constant voltage circuit part 2 and a charge pump circuit part 3. The constant voltage circuit part 2 generates a preset constant voltage from an input voltage Vi1 input to an input terminal IN1, and outputs the generated voltage from a first output terminal OUT1 as an output voltage Vo1. The output voltage Vo1 of the constant voltage circuit part 2 is input to the charge pump circuit part 3. The charge pump circuit part 3 outputs an integral multiple of the output voltage Vo1 from a second output terminal OUT2 as an output voltage Vo2.

The constant voltage circuit part 2 includes a voltage control part 11 and an overcurrent protection circuit part 12. The voltage control part 11 performs control so that the output voltage Vo1 is constant at a predetermined constant voltage V1. The overcurrent protection circuit part 12 detects a current io1 output from the first output terminal OUT1 and a current io2 output from the second output terminal OUT2. When the detected output current io1 and/or the detected output current io2 is higher than or equal to a predetermined value i2, the overcurrent protection circuit part 12 reduces the output voltage Vo1 and the output current io1 so that the Vo1-io1 relationship has the foldback characteristic.

The voltage control part 11 includes an operational amplifier AMP1, a reference voltage generator circuit 21 generating and outputting a predetermined reference voltage Vr1, a voltage control transistor M1 formed of a PMOS transistor, and resistors R1 and R2. The voltage control transistor M1 and the resistors R1 and R2 are connected in series between the input terminal IN1 and ground. The connection of the voltage control transistor M1 and the resistor R1 is connected to the first output terminal OUT1. The series circuit of the resistors R1 and R2 generates a first detection voltage Vd1 proportional to the output voltage Vo1, and outputs the first detection voltage Vd1 to the non-inverting input terminal of the operational amplifier AMP1. The reference voltage Vr1 is input to the inverting input terminal of the operational amplifier AMP1. The output terminal of the operational amplifier AMP1 is connected to the gate of the voltage control transistor M1.

The overcurrent protection circuit part 12 includes operational amplifiers AMP2 and AMP3, a current detection transistor M2 formed of a PMOS transistor, current control transistors M3 and M4 each formed of a PMOS transistor, and resistors R3, R4, and R5. The current detection transistor M2 and the resistor R3 are connected in series between the input terminal IN1 and ground. The gate of the current detection transistor M2 is connected to the output terminal of the operational amplifier AMP1. The connection of the current detection transistor M2 and the resistor R3 is connected to the inverting input terminals of the operational amplifiers AMP2 and AMP3.

The current control transistors M3 and M4 are connected in parallel between the input terminal IN1 and the gate of the voltage control transistor M1. The output terminal of the operational amplifier AMP2 is connected to the gate of the current control transistor M3. The output terminal of the operational amplifier AMP3 is connected to the gate of the current control transistor M4. The resistors R4 and R5 are connected in series between the second output terminal OUT2 and ground. The series circuit of the resistors R4 and R5 generates a second detection voltage Vd2 proportional to the output voltage Vo2, and outputs the second detection voltage Vd2 to the non-inverting input terminal of the operational amplifier AMP3. The first detection voltage Vd1 is input to the non-inverting input terminal of the operational amplifier AMP2.

Next, the charge pump circuit part 3 includes switch elements SW1, SW2, SW3, and SW4 each formed of a MOS transistor, capacitors C1, C2, and C3, and a clock generator circuit 25 controlling the switching of the switch elements SW1 through SW4. Each of the switch elements SW1 through SW3 is formed of a PMOS transistor, and the switch element SW4 is formed of an NMOS transistor. The switch elements SW1 and SW3 are connected in series between the first and second output terminals OUT1 and OUT2. The switch elements SW2 and SW4 are connected in series between the first output terminal OUT1 and ground.

The clock generator circuit 25 generates and outputs clock signals CLK1, CLK2, and CLK3. The clock signal CLK1 is input to the gate of the switch element SW1. The clock signal CLK3 is input to the gate of each of the switch elements SW2 and SW3. The clock signal CLK2 is input to the gate of the switch element SW4. The capacitor C1 is connected between the first output terminal OUT1 and ground. The capacitor C3 is connected between the second output terminal OUT2 and ground. The capacitor C2 is connected between the connection of the switch elements SW1 and SW3 and the connection of the switch elements SW2 and SW4.

Figure 4:
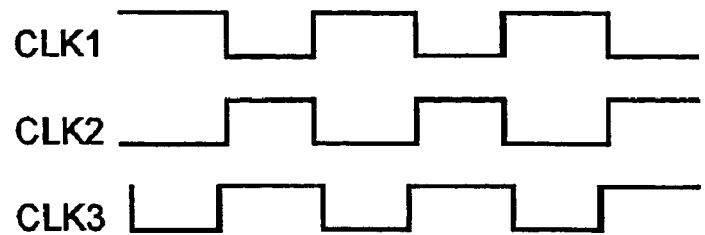
FIG. 4 is a timing chart of clock signals output from a clock generator circuit of the DC-DC converter according to the embodiment of the present invention.

In this configuration, in the voltage control part 11, the operational amplifier AMP1 controls the gate voltage of the voltage control transistor M1 so that the first detection voltage Vd1 is equalized with the reference voltage Vr1. As a result, the output voltage Vo1 is equal to Vr1×(R1×R2)/R2, where R1 and R2 indicate the resistances of the resistors R1 and R2, respectively. FIG. 4 is a diagram showing examples of the clock signals CLK1 through CLK3 generated in the clock generator circuit 25. Referring to FIG. 4, the clock signals CLK1 and CLK2 are opposite in phase. When the level of the clock signal CLK1 is LOW, the switch element SW1 is switched ON. When the level of the clock signal CLK2 is HIGH, the switch element SW4 is switched ON. Accordingly, the switch elements SW1 and SW4 are switched ON and OFF simultaneously.

When the level of the clock signal CLK3 is LOW, the switch elements SW2 and SW4 are switched ON. When the switch elements SW1 and SW4 are switched ON, the capacitor C2 is charged with the output voltage Vo1 of the constant voltage circuit part 2. When the switch elements SW2 and SW4 are switched ON, the voltage of the capacitor C2 is added to the capacitor C1, so that the capacitor C3 is charged with the combined voltage. Accordingly, the voltage of the capacitor C3, which is the output voltage Vo2 of the charge pump circuit part 13, is double the output voltage Vo1 of the constant voltage circuit part 2.

Figure 5:
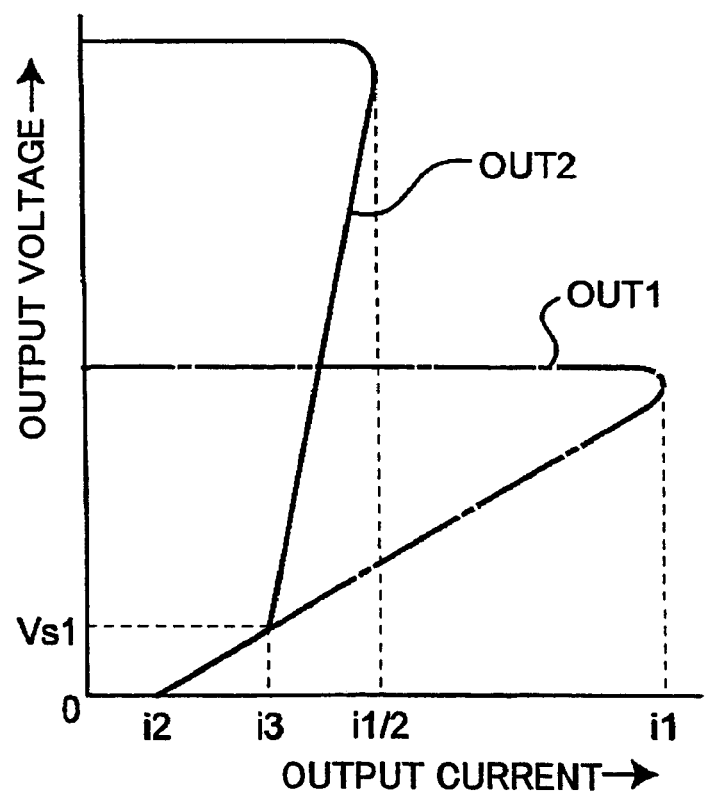
FIG. 5 is a graph showing the relationship between output voltage and output current at each output terminal of the DC-DC converter according to the embodiment of the present invention.

Since the output voltage Vo2 of the charge pump circuit part 3 is double the output voltage Vo1 of the constant voltage circuit part 2, the output current io2 of the charge pump circuit part 3 is half of the output current io1 of the constant voltage circuit part 2 as shown in FIG. 5. FIG. 5 is a diagram showing the relationship between the output voltage Vo1 and the output current io1 and the relationship between the output voltage Vo2 and the output current io2. In FIG. 5, the characteristic indicated by OUT1 represents the relationship between the output voltage Vo1 and the output current io1, and the characteristic indicated by OUT2 represents the relationship between the output voltage Vo2 and the output current io2.

When the output current io1 of the constant voltage circuit part 2 increases to i1 shown in FIG. 5, the voltage at the inverting input terminal of the operational amplifier AMP2 exceeds the first detection voltage Vd1. As a result, the current control transistor M3 is switched ON to increase the gate voltage of the voltage control transistor M1. This reduces the output voltage Vo1 of the constant voltage circuit part 2, and controls an increase in the current io1 output from the voltage control transistor M1. When the output voltage Vo1 of the constant voltage circuit part 2 decreases, the first detection voltage Vd1 also decreases. Accordingly, the current io1 output from the voltage control transistor M1 starts to decrease.

Referring to FIG. 5, even when the output voltage Vo1 of the constant voltage circuit part 2 is reduced to 0 V, the output current io1 is only reduced to i2. This is because if the overcurrent protection circuit part 12 reduces the output current io1 to 0 A, the output voltage Vo1 of the constant voltage circuit part 2 may not rise in the case of rising from 0 V. When the output voltage Vo1 of the constant voltage circuit part 2 is 0 V, a positive offset voltage is caused to be generated at the inverting input terminal of each of the operational amplifiers AMP2 and AMP3 so that a current of i2 flows as the output current io1. The offset voltage may be generated by, for instance, changing the size of each of the transistors used for the two inputs of each of the operational amplifiers AMP2 and AMP3.

On the other hand, in case the output voltage Vo2 of the charge pump circuit part 3 decreases or the output current io1 of the constant voltage circuit part 2 increases, when the voltage at the inverting input terminal of the operational amplifier AMP3 becomes higher than the voltage at the non-inverting input terminal thereof, the output voltage of the operational amplifier AMP3 decreases to reduce the gate voltage of the current control transistor M4. As a result, the current control transistor M4 is switched ON to increase the gate voltage of the voltage control transistor M1, thus reducing the output current io1 of the constant voltage circuit part 2. Accordingly, the output voltage Vo1 of the constant voltage circuit part 2 also decreases to reduce the output voltage Vo2 of the charge pump circuit part 3, thus further reducing the output current io1 of the constant voltage circuit part 2.

The resistances of the resistors R1 and R2 and the resistances of the resistors R4 and R5 are set so that the first detection voltage Vd1 is lower than the second detection voltage Vd2 while the output voltage Vo1 of the constant voltage circuit part 2 remains a predetermined value and while the output voltage Vo1 of the constant voltage circuit part 2 is lower than the output voltage Vo2 of the charge pump circuit part 3. Therefore, as shown in FIG. 5, a first overcurrent protection circuit part formed by the operational amplifier AMP2 and the current control transistor M3 operates until the output voltage Vo1 of the constant voltage circuit part 2 is equalized with the output voltage Vo2 of the charge pump circuit part 3 at a voltage Vs1.

On the other hand, when the output voltage Vo2 of the charge pump circuit part 3 becomes lower than the output voltage Vo1 of the constant voltage circuit part 2 as in a case where the second output terminal OUT2 of the charge pump circuit part 3 is short-circuited to ground, a second overcurrent protection circuit part formed by the operational amplifier AMP3 and the current control transistor M4 operates. Therefore, the output voltage Vo1 of the constant voltage circuit part 2 can be reduced below the voltage Vs1, and the output current io1 of the constant voltage circuit part 2 can be reduced to the current value i2. Here, the PMOS transistor M2 and the resistor R3 form a current detection circuit part, the resistors R1 and R2 form a first output voltage detection circuit part, and the resistors R4 and R5 form a second output voltage detection circuit part according to this embodiment. Further, referring to FIG. 3, the constant voltage circuit part 2 and the charge pump circuit part 3 except the capacitors C1 through C3 can be integrated into a single IC.

Thus, according to the DC-DC converter 1 of this embodiment, when the output voltage Vo2 of the charge pump circuit part 3 becomes lower than the output voltage Vo1 of the constant voltage circuit part 2, the second overcurrent protection circuit part formed by the operational amplifier AMP3 and the current control transistor M4 reduces the output voltage Vo1 of the constant voltage circuit part 2 below the voltage Vs1, and reduces the output current io1 of the constant voltage circuit part 2 to a desired value, that is, the current value i2. Therefore, even if the output terminal OUT2 of the charge pump circuit part 3 is short-circuited to ground, the output current io2 of the charge pump circuit part 3 can be reduced to the desired current value i2, thereby increasing reliability.

The present invention is not limited to the specifically disclosed embodiment, and variations and modifications may be made without departing from the scope of the present invention.

The present application is based on Japanese priority patent application No. 2003-109217, filed on Apr. 14, 2003, the entire contents of which are hereby incorporated by reference.

The invention claimed is:

1. A DC-DC converter of a charge pump type, comprising:
a constant voltage circuit for outputting a first voltage;
a charge pump circuit for outputting a second voltage based on the first voltage;
a current detection circuit for outputting a third voltage based on an output current of the constant voltage circuit;
a first output voltage detection circuit for outputting a first detection voltage proportional to the first voltage;
a first overcurrent protection circuit for reducing the first voltage and the output current of the constant voltage circuit based on a comparison of the third voltage and the first detection voltage;
a second output voltage detection circuit for outputting a second detection voltage proportional to the second voltage; and
a second overcurrent protection circuit for reducing the first voltage and the output current of the constant voltage circuit based on a comparison of the third voltage and the second detection voltage.

2. The DC-DC converter of claim 1, wherein the first overcurrent protection circuit reduces the first voltage and the output current of the constant voltage circuit when the third voltage is greater than the first detection voltage.

3. The DC-DC converter of claim 1, wherein the second overcurrent protection circuit reduces the first voltage and the output current of the constant voltage circuit when the third voltage is greater than the second detection voltage.

4. The DC-DC converter of claim 1, wherein the first output voltage detection circuit generates and outputs the first detection voltage so that the first detection voltage is higher than the second detection voltage when the first voltage output from the constant voltage circuit is higher than the second voltage output from the charge pump circuit.

5. The DC-DC converter of claim 1, wherein the first overcurrent protection circuit operates when the first voltage output from the constant voltage circuit is lower than the second voltage output from the charge pump circuit.

6. The DC-DC converter of claim 1, wherein the second overcurrent protection circuit operates when the second voltage output from the charge pump circuit is lower than the first voltage output from the constant voltage circuit.

7. A DC-DC converter of a charge pump type, comprising:
constant voltage means for outputting a first voltage;
charge pump means for outputting a second voltage based on the first voltage;
current detection means for outputting a third voltage based on an output current of the constant voltage means;
first output voltage detection means for outputting a first detection voltage proportional to the first voltage;
first overcurrent protection means for reducing the first voltage and the output current of the constant voltage means based on a comparison of the third voltage and the first detection voltage;
second output voltage detection means for outputting a second detection voltage proportional to the second voltage; and
second overcurrent protection means for reducing the first voltage and the output current of the constant voltage means based on a comparison of the third voltage and the second detection voltage.

8. The DC-DC converter of claim 7, wherein the first overcurrent protection means reduces the first voltage and the output current of the constant voltage means when the third voltage is greater than the first detection voltage.

9. The DC-DC converter of claim 7, wherein the second overcurrent protection means reduces the first voltage and the output current of the constant voltage means when the third voltage is greater than the second detection voltage.

10. The DC-DC converter of claim 7, wherein the first output voltage detection means generates and outputs the first detection voltage so that the first detection voltage is higher than the second detection voltage when the first voltage output from the constant voltage means is higher than the second voltage output from the charge pump means.

11. The DC-DC converter of claim 7, wherein the first overcurrent protection means operates when the first voltage output from the constant voltage means is lower than the second voltage output from the charge pump means.

12. The DC-DC converter of claim 7, wherein the second overcurrent protection means operates when the second voltage output from the charge pump means is lower than the first voltage output from the constant voltage means.

13. A method comprising:
outputting a first voltage from a first circuit part;
outputting a second voltage from a second circuit part based on the first voltage;
outputting a third voltage from a third circuit part based on an output current of the first voltage;
outputting a detection voltage from a fourth circuit part, wherein the detection voltage is proportional to the first voltage; and
reducing the first voltage and the output current of the first circuit part based on a comparison of the third voltage and the detection voltage from the fourth circuit part.

* * * * *

UNITED STATES PATENT AND TRADEMARK OFFICE
CERTIFICATE OF CORRECTION

PATENT NO. : 7,436,163 B2
APPLICATION NO. : 11/635763
DATED : October 14, 2008
INVENTOR(S) : Tomonari Katoh It is certified that error appears in the above-identified patent and that said Letters Patent is hereby corrected as shown below:

Title Page;

Item [63] after "7,187,159" add --, filed as 371 of international application No. PCT/JP04/05236  04/13/2004--; and Between lines (63) and (51), insert --(30) Foreign Application Priority Data Apr. 14, 2003 (JP)  2003-109217--.

Signed and Sealed this

Sixteenth Day of June, 2009

JOHN DOLL
*Acting Director of the United States Patent and Trademark Office*